United States Patent
Bucher et al.

(10) Patent No.: US 6,471,379 B2
(45) Date of Patent: Oct. 29, 2002

(54) WAVEGUIDE ILLUMINATION ASSEMBLY FOR AN AUTOMOBILE LICENSE PLATE

(75) Inventors: Lloyd Keith Bucher, Livingston, TN (US); George Robert Hulse, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 42 days.

(21) Appl. No.: 09/813,662

(22) Filed: Mar. 21, 2001

(65) Prior Publication Data

US 2002/0136019 A1 Sep. 26, 2002

(51) Int. Cl.[7] .................................. B60Q 1/56
(52) U.S. Cl. ................ 362/497; 362/540; 362/551; 362/511; 40/547; 40/556
(58) Field of Search ............... 362/497, 540, 362/551, 559, 560, 511; 40/546, 547, 556

(56) References Cited

U.S. PATENT DOCUMENTS

| | | |
|---|---|---|
| 2,203,785 A | 6/1940 | Hoover et al. |
| 2,689,948 A | 9/1954 | Rothman |
| 4,323,951 A | 4/1982 | Pasco |
| 4,406,490 A | 9/1983 | Torii et al. |
| D281,490 S | 11/1985 | Lien |
| 4,857,890 A | 8/1989 | Solow |
| 5,029,053 A | 7/1991 | Solow |
| 5,150,960 A | 9/1992 | Redick |
| 5,150,961 A * | 9/1992 | Gonzalez ..................... 362/497 |
| 5,156,455 A | 10/1992 | Kuo |
| 5,255,166 A | 10/1993 | Gonzalez |
| 5,301,091 A * | 4/1994 | Chen ........................... 362/263 |
| 5,495,400 A | 2/1996 | Currie |
| 5,521,799 A | 5/1996 | VerKamp |
| 5,584,556 A | 12/1996 | Yokoyama et al. |
| 5,934,798 A * | 8/1999 | Roller et al. ................. 362/497 |

* cited by examiner

Primary Examiner—Laura K. Tso
Assistant Examiner—Ronald E. DelGizzi
(74) Attorney, Agent, or Firm—Reising, Ethington, Barnes, Kisselle, Learman & McCulloch, P.C.

(57) ABSTRACT

A waveguide illumination assembly for an automobile license plate includes a single light source and a transport or waveguide disposed outward from the license plate perimeter. The light source shines into one end of the waveguide. The waveguide has one or more arms, each of which has an array of reflective elements. Light is internally reflected as it travels through the waveguide until it strikes a reflective element, thereby directing light through an opposing longitudinal side of the waveguide arm and onto the license plate.

19 Claims, 3 Drawing Sheets

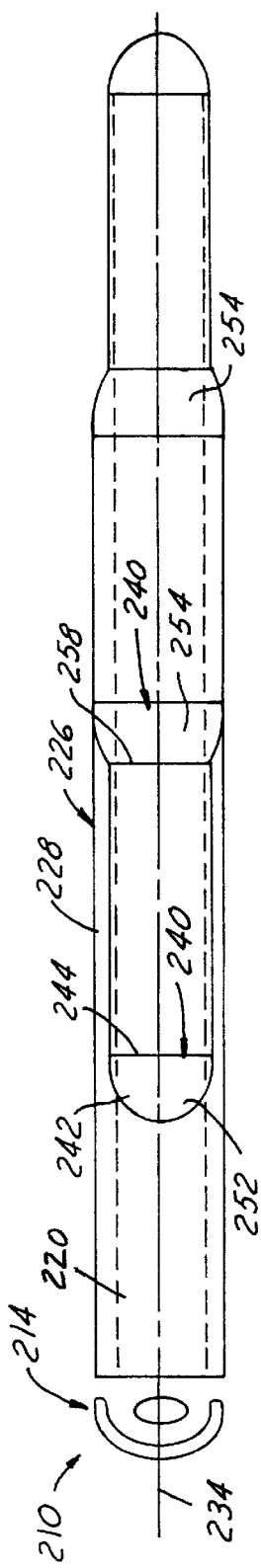
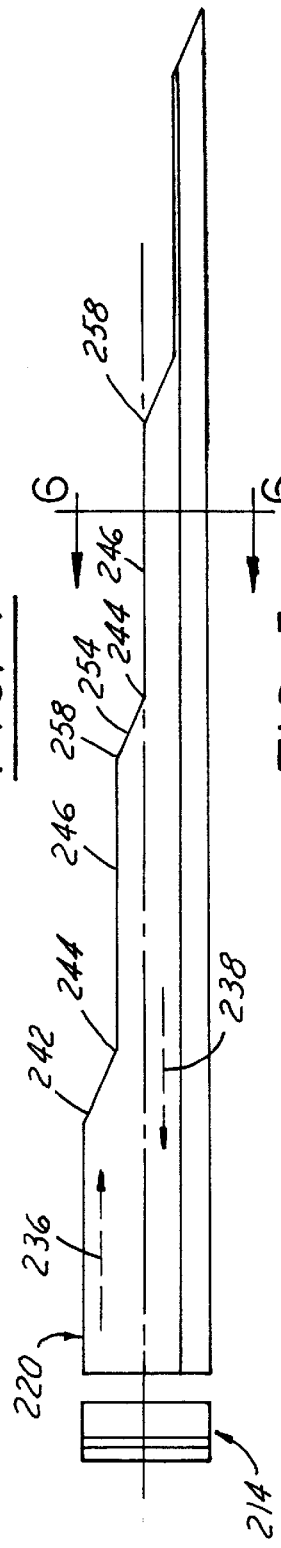
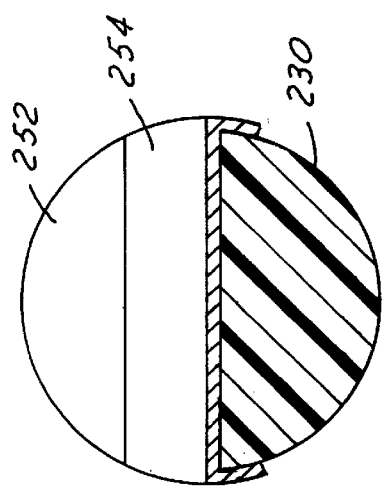
FIG. 4
FIG. 5
FIG. 6

WAVEGUIDE ILLUMINATION ASSEMBLY FOR AN AUTOMOBILE LICENSE PLATE

TECHNICAL FIELD

The present invention relates generally to waveguide illumination system and, more particularly, to waveguide illumination assembly for an automotive license plate.

BACKGROUND OF THE INVENTION

Vehicle license plates must be illuminated at a prescribed intensity in accordance with the Federal Motor Vehicle Safety Standard, FMVSS 108 guidelines as well as other international regulations such as ECE Regulation 4. The FMVSS 108 regulatory test consists of eight illumination measurement sites spaced across the entire face of the license plate. In order to meet the regulatory illumination requirements light must be distributed evenly across the entire license plate face from a source located outward of the license plate perimeter. Illumination of a license plate directly from a single light bulb is likely to produce hot spots, wherein areas of the plate are over illuminated and other areas are not illuminated enough. Consequently, in order to distribute light evenly across the license plate, thereby avoiding hot spots of concentrated light, a multitude of light bulbs are typically utilized for illumination. This type of design can be expensive to manufacture and replacement of the bulbs is a maintenance concern for the customer.

U.S. Pat. No. 2,689,948 granted to Gerald S. Rothman, Sep. 21, 1954, discloses a form of waveguide utilized in connection with a vehicle license plate. However, the Rothman waveguide is for aesthetic and signaling purposes and not for illumination of a license plate. Furthermore, the Rothman patent teaches that a waveguide can glow or appear illuminated with the incorporation of evenly spaced and identical notches placed into the glowing surface. The glow is a result of internal light rays being reflected externally out of the waveguide.

The notches, however, are not used for illumination of the license plate; rather, they direct the light in the waveguide outward away from the license plate. Also, because the notches are placed upon the outer aesthetic surface portion of the waveguide, they can collect dirt which will block the aesthetic illumination from the waveguide. This illumination degradation is compounded by the decreasing concentration of internal light rays available for external reflection through each succeeding notch. With each notch being the same size and spaced evenly apart, the end of the waveguide positioned closest to the light source will glow brighter than the tail end. Therefore, even light distribution is not achieved.

SUMMARY OF INVENTION

In accordance with the present invention, there is provided a waveguide illumination assembly positioned outward from the perimeter of a license plate. The waveguide illumination assembly includes a single light source which emits light rays into a coupling end of a transport. Congruently attached to a tail end of the transport is at least one arm. Each arm receives a proportionate intensity of light from the transport. The arms each have an outboard side, an inboard side and a termination end. The inboard side is configured longitudinally between the outboard side and the license plate. The outboard side has an array of reflective elements for internally reflecting light rays at prescribed angles causing the same light rays to refract through the inboard side and onto the license plate.

These elements vary progressively in the forward direction accounting for the changing concentrations of light rays within the light transport.

To enhance the efficiency of the waveguide, a reflective coating or shell is preferably positioned over the outboard side of each arm to reflect any escaping light rays back into the waveguide. Although not of primary importance, this coating may also keep the outboard side free of dirt and scratches which could degrade the internal reflective characteristics of the outboard side. The inboard side is preferably polished smooth creating a surface least likely to collect dirt and easy to clean.

Another variation of the array of reflective elements preferably includes an outboard side with a roughened surface. The roughness of the roughened surface progressively increases in the forward direction thereby adjusting for the decreasing concentration of internal light rays by increasing the internal reflection characteristics of the outboard side capable of causing refraction through the inboard side. This variation of roughness assures an even light distribution across the license plate thereby meeting FMVSS 108 regulatory requirements.

An advantage of the present invention is the use of a single light source, thereby minimizing maintenance costs.

Another advantage of the present invention is that it provides an even distribution of light across the license plate.

BRIEF DESCRIPTION OF THE DRAWINGS

Preferred exemplary embodiments of the present invention will hereinafter be described in conjunction with the appended drawings, wherein like numerals denote like elements, and wherein:

FIG. 4 is a top perspective view of a second embodiment of the waveguide illumination assembly;

FIG. 5 is a side perspective view of the second embodiment of the waveguide illumination assembly;

FIG. 6 is a cross-sectional view of the waveguide illumination assembly taken substantially along line 6—6 of FIG. 5 viewed in the direction of the arrows;

DETAILED DESCRIPTION OF THE PREFERRED EMBODIMENTS

Figure 1:
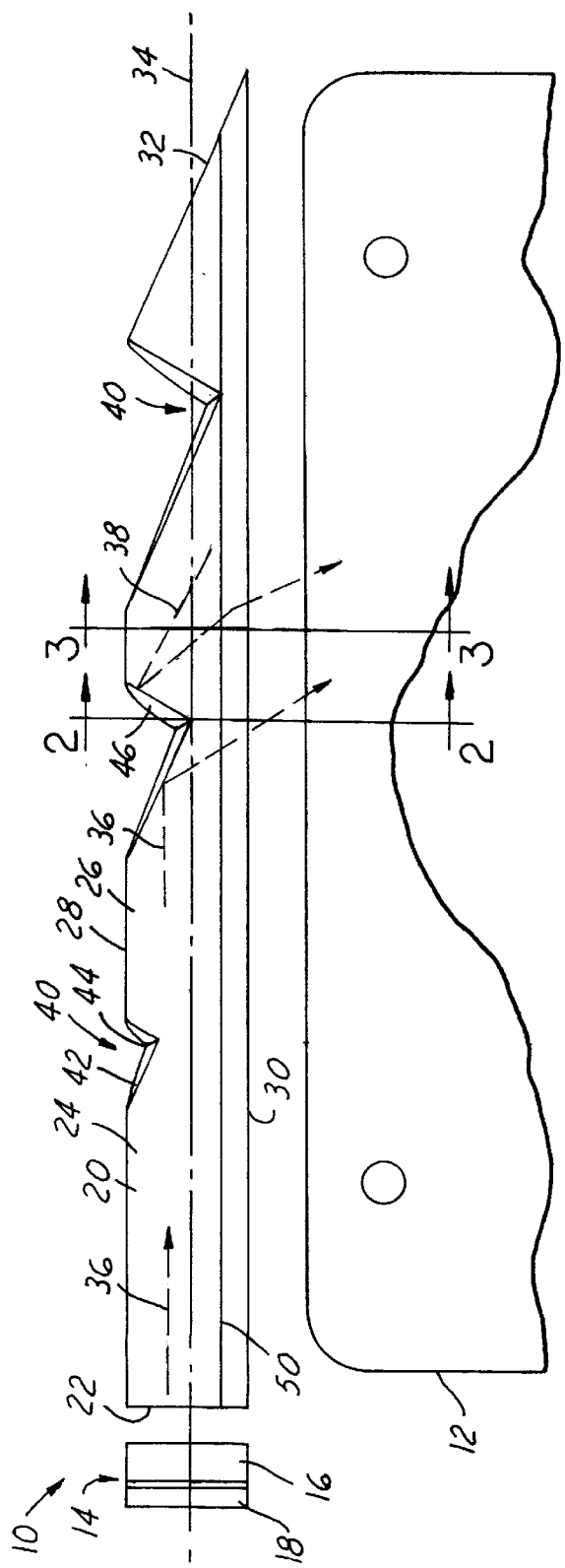
FIG. 1 is a side perspective view of a waveguide illumination assembly for an automobile license plate.

Referring first to FIG. 1, there is shown a waveguide illumination assembly 10 constructed in accordance with the invention. The waveguide illumination assembly 10 is disposed outwardly about a license plate perimeter 12. The positioning is such that the waveguide illumination assembly 10 illuminates the surface of the license plate. Waveguide illumination assembly 10 has a light source 14 preferably having a single bulb 16 and a reflective surface 18. A transport 20 is positioned adjacent to the bulb 16. The bulb is disposed between the reflective surface 18 and a light coupling end 22 of the transport 20. The light coupling end 22 receives and transports light rays from the light source 14.

Transport 20 further has a tail end 24 disposed opposite to, and forward from, the light coupling end 22. Congruently attached to the tail end 24 is at least one arm 26. Arm 26 and the transport 20 are preferably unitary and made of the same translucent material. The arm 26 has an outboard side 28 and an inboard side 30. The inboard side 30 faces and illuminates the license plate and is disposed longitudinally between the license plate and the unitary outboard side 28. The outboard side 28 and the inboard side 30 extend from a substantially flat termination end 32 of the arm 26 to the tail end 24 of the transport 20. The transport 20 and the arm 26 share a common centerline 34. For the first and second embodiments, shown in FIGS. 1–6, the centerline 34 is generally a straight line, however, this is not the case for the third and fourth embodiments to be described later.

Forward light rays 36 emitted by the light source 14 generally extend along the centerline 34 within the transport 20 and the arm 26. Any uncontrolled reflection of forward light rays 36 should remain internal and incidental or they could refract and escape the waveguide illumination assembly 10 away from the license plate. The angle of refraction necessary for the light rays to escape is characteristic of the light transport material utilized. Preferred materials are clear plastic, polycarbonate, or acrylic. Forward light rays 36 which reach the termination end 32 of the arm 26 are either refracted through the termination end 32 and lost, or are internally reflected. If reflected, they become rearward light rays 38 traveling generally back toward the light source 14 until they refract through the inboard side 30 and onto the license plate.

Figure 2:
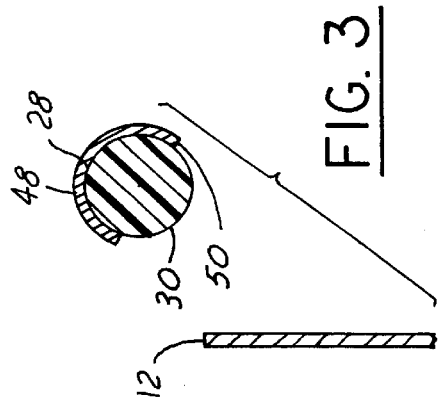
FIG. 2 is a cross-sectional view of the waveguide illumination assembly taken substantially along line 2—2 of FIG. 1 viewed in the direction of the arrows 1.
Figure 3:
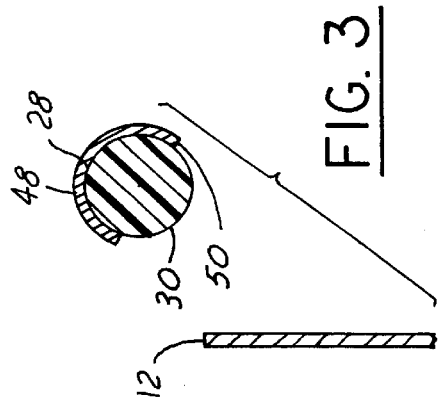
FIG. 3 is a cross-sectional view of the waveguide illumination assembly taken substantially along line 3—3 of FIG. 1 viewed in the direction of the arrows.

Referring to FIGS. 1, 2, and 3, arm 26 further has an array of reflective elements 40. Each element 40 is designed to internally reflect a controlled percentage of the forward light rays 36 at a prescribed angle or range of angles. The same light rays will then refract through the inboard side 30, escaping the waveguide, and illuminating the license plate. Each reflective element 40 preferably has an oblique surface 42. The oblique surface 42 perimeter is generally defined by the outboard side 28 and a edge 44. The common edge 44 is substantially perpendicular to the centerline 34 of the waveguide. Each successive, forward, common edge 44 is generally disposed further into the arm 26 toward the license plate perimeter 12. The oblique surface 42 is generally slanted in reference to the centerline 34 wherein the common edge 44 is disposed forward of the oblique surface 34. Each successive oblique surface 42 is substantially planar but need not be parallel to the next oblique surface 42. The slope or angle of each oblique surface 42 is such that forward light rays 36 internally reflect off the oblique surface 42 and refract through the inboard side 30 thereby illuminating the license plate. The slope of each oblique surface 42 is dependent upon the concentration of light rays to be refracted and the area of the license plate to be illuminated.

Each element of the array of reflective elements 32 for the first embodiment also has an opposing oblique surface 46. The opposing oblique surface 46 perimeter is defined by the outboard side 28 and the common edge 44. Opposing oblique surface 44 generally slants outwardly from the common edge 44 in a forward direction. Opposing oblique surface 46 internally reflects the rearward light rays 38 at an appropriate angle to then refract reflected rearward light rays 38 through inboard side 30 to illuminate the license plate.

The inboard side 30 of arm 26 is preferably polished plastic, acrylic, or polycarbonate. Inboard side 30 is unlikely to collect dirt because the surface is polished, and free of notches or voids which would be difficult to clean. The outboard side 28 is generally unitary with the inboard side 30, however, the surfacing of the outboard side 28 may not necessarily be polished, the outboard side 28 can be roughened, characteristic of acid sketching or sandblasting, to enhance the inwardly internal reflective characteristics of the arm 26 of the transport 20. The roughness feature can be utilized in place of the oblique surfaces 42, 46 of the array of reflective elements 40. If so, the roughness preferably increases in the forward direction along the arm 26. The progressive increase in roughness is necessary to achieve even illumination across the license plate. The greater the roughness, the greater the internal reflection characteristics which cause light ray refraction through the inboard side 30 and onto the license plate. The progressive increase in roughness is required because the concentration of internal light rays progressively decreases in the forward direction along the arm 26.

As an alternative to a roughened surface, the internal reflective characteristics of outboard side 28 can be enhanced by coating or encasing the outboard side 28 with a reflector plating or shell 48. The reflector shell 48 has two longitudinal edges 50. Located between each edge 50 is the polished inboard side 30 which generally faces the license plate. All refracted rays are concentrated and transmitted between the two longitudinal edges 50 upon the license plate. To enhance the efficiency of light distribution further, the termination end 32 can be slanted and substantially parallel to the oblique surface 42. The termination end 32 is also preferably encased with the reflector shell 48 or otherwise roughened.

The cross section of the transport 20 and the at least one arm 26 is generally shown as circular or conical, however, any variety of shapes will suffice including square or rectangular. Also, although only three reflective elements 40 are shown, it will be appreciated that any number of such elements can be used, as necessary or desirable for a particular application.

Referring now to FIGS. 4, 5 and 6 a second preferred embodiment is shown. All numbering is correlated to the first embodiment with the addition of numeral two as a prefix. The opposing oblique surface 46 of reflective element 40 of the first embodiment is replaced with a longitudinal surface 246 in the second embodiment. The longitudinal surface 246 of each element of the array of reflective elements 240 is generally parallel to the centerline 234.

The array of reflective elements 240 is further distinguished by a first element 252 and succeeding elements 254. The succeeding elements 254 are disposed forward of the first element 252. The oblique surface 242 perimeter of the first element 252 is defined by the outboard side 228 and the common edge 244. A succeeding oblique surface 256 perimeter of the succeeding elements 254 is defined by an apex edge 258, the outboard side 228 and the common edge 244. The apex edge 258 and the common edge 244 are generally parallel. Each longitudinal surface 246 perimeter of the array of reflective elements 240 is defined by the common edge 244, the outboard side 228 and the apex edge 258.

Like the first embodiment, the oblique surface 242 functions to internally reflect the forward rays 236. Unlike the first embodiment, there is no opposing oblique surface 46. Therefore, any rearward light rays 238 are reflected internally upon the longitudinal surface 246. Without the slant of the opposing oblique surface 46 found in the first embodiment, the angle of refraction internal to the inboard side 230 is not as readily achieved. Therefore less rearward light rays 238 will illuminate the license plate. Some of the rearward light rays 238 may be lost as they are reflected back into the light source 214.

Advantages of the second embodiment, over the first embodiment, includes the decrease in material, and therefore weight, necessary to construct the arm 226. Because the volume of the arm 226 is essentially less, the internally reflecting light rays 236, 238 have less distance to travel. Therefore a smaller percentage of light is lost due to imperfections within the arm 226 material.

Figure 7:
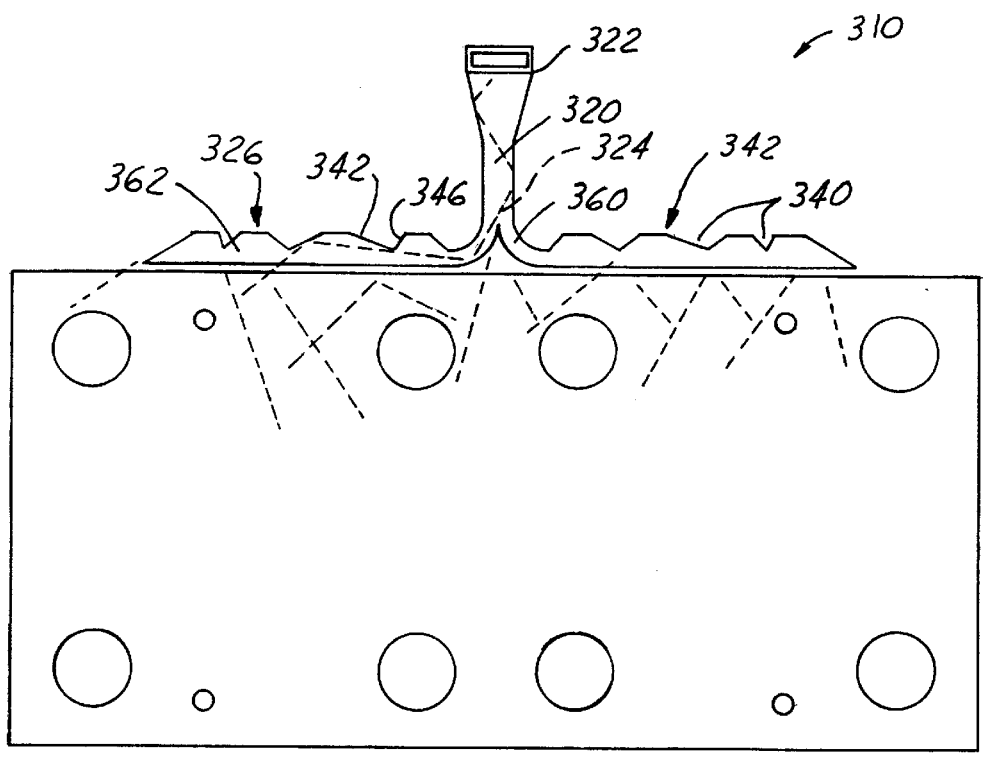
FIG. 7 is a perspective view of a third embodiment of the waveguide illumination assembly.

Referring now to FIG. 7, a third embodiment is shown. All numbering is correlated to the first embodiment with the addition of numeral three as a prefix. Unlike the first and second embodiments, the third embodiment of the waveguide illumination assembly 310 has two arms 326, not one. The transport 320 is generally vertical and positioned centrally above the license plate with the light coupling end 322 above the tail end 324.

Each arm 326 has an elbow 360 and a horizontal portion 362. The elbow 360 is attached congruently to the tail end 324. The horizontal portion 362 contains the array of reflective elements 340 and generally spans the length of the license plate in both directions. Each element of the array of reflective elements 340 contain both the oblique surface 342 and the opposing oblique surface 346. The bend radius of elbow 360 to arm 326 diameter is generally 3:1 or larger. The transmission of light through the bend would be appreciably lost with ratios below 3:1. The bend radius limitation will change to a small degree with changing waveguide material, thus changing index of refractions.

Figure 8:
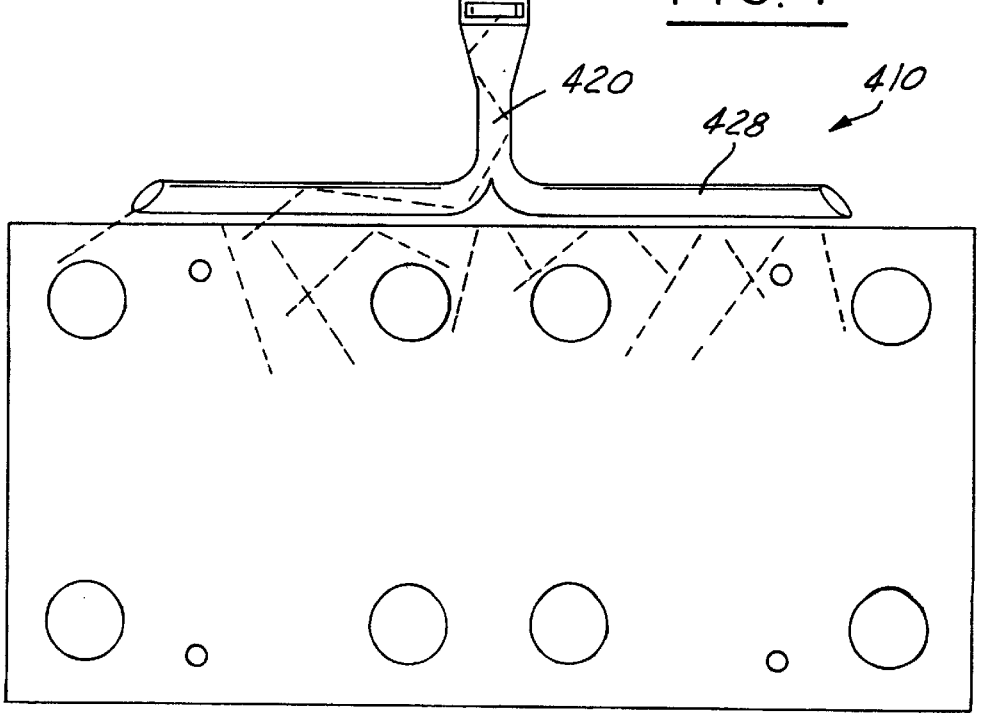
FIG. 8 is a perspective view of a fourth embodiment of the waveguide illumination assembly.

Referring now to FIG. 8, a fourth preferred embodiment is shown in accordance with the invention. All numbering is correlated to the first and third embodiments with the addition of numeral four as a prefix. The fourth embodiment is identical to the third embodiment with the exception that the array of reflective elements 440 does not contain oblique surfaces 342, 346 of the third embodiment. The array of reflective elements 440 is implemented as a roughening of the outboard side 428. The roughness increases and can be spread laterally in the forward direction of each horizontal portion 462. The roughness feature of the fourth embodiment can be replaced with a reflector shell 448 similar to that described in the first embodiment.

Accordingly, it should thus be apparent that there has been provided in accordance with the present invention a waveguide assembly for license plate illumination that achieves the aims and advantages specified herein. It will of course be understood that the foregoing description is of preferred exemplary embodiments and that the invention is not limited to the specific embodiments shown. Various changes and modifications will become apparent to those skilled in the art. For example, although the illustrated embodiments have been described as they would be implemented using one or two waveguide arms transporting light from a single light source across a single side of a license plate, it will be appreciated that the arms can be positioned to illuminate a license plate from a plurality of sides of the license plate. It can also be appreciated that the arm takes the form of a loop, illuminating the license plate from all four sides. The loop can be accomplished by utilizing additional elbows to that already illustrated in FIGS. 7 and 8. All such changes and modifications are intended to come within the scope of the appended claims.

I claim:

1. A waveguide illumination assembly for illuminating a vehicle license plate comprising:

a light source;

a transport positioned outboard of the license plate perimeter, the transport having a light coupling end and a tail end; and at least one arm positioned outboard of the license plate perimeter, the at least one arm contiguous to the tail end of the primary transport, the arm having a termination end, an outboard side, and an inboard side, the outboard and inboard sides extending from the tail end to the termination end, the inboard side disposed substantially between the license plate and the arm, the outboard side defining an array of reflective elements shaped to direct internally reflected light through the inboard side onto the license plate.

2. A waveguide illumination assembly as defined in claim 1 wherein the light source comprises a single light bulb and a reflective surface, the bulb positioned between the reflective surface and the light coupling end, the light coupling end perpendicular to a common centerline of the transport and the at least one arm.

3. A waveguide illumination assembly as defined in claim 2, wherein each reflective element of the array of reflective elements has a oblique surface sloped inwardly forward along the centerline, the oblique surface perimeter defined by the outboard side of the arm and a common edge of the oblique surface, the common edge perpendicular to the centerline, wherein each succeeding oblique surface is positioned further from the light source along the centerline.

4. A waveguide illumination assembly as defined in claim 3, wherein each succeeding common edge of the oblique surface is extended deeper into the arm.

5. A waveguide illumination assembly as defined in claim 4 wherein the termination end is planar and circumscribed by the outboard and inboard sides, the termination end forming an angle with the centerline.

6. A waveguide illumination assembly as defined in claim 4 wherein each one of the array of reflective elements has a longitudinal surface contiguous to the common edge of the oblique surface, the longitudinal surface coextended to the centerline.

7. A waveguide illumination assembly as defined in claim 6 wherein the longitudinal surface is extended longitudinally to the next oblique surface, wherein the first oblique surface perimeter is defined by the outward side of the arm and the common edge of the oblique surface, and the successive oblique surface perimeters are each defined by an apex edge and the common edge of the successive oblique surface and the outward side of the arm, the apex edge and the common edge disposed parallel.

8. A waveguide illumination assembly as defined in claim 7 wherein the termination end and each oblique surface of each arm are parallel.

9. A waveguide illumination assembly as defined in claim 8 wherein the apex edge is parallel to the common edge.

10. A waveguide illumination assembly as defined in claim 4 wherein each one of the array of reflective elements has an opposing oblique surface sloped outwardly forward along the centerline, the opposing oblique surface perimeter defined by the outward side of the arm and the common edge.

11. A waveguide illumination assembly as defined in claim 1 wherein the outboard side and the termination end of the arm are covered by a reflector shell.

12. A waveguide illumination assembly as defined in claim 11 wherein the at least one arm is one arm, the transport and the arm being collinear spanning the license plate from above.

13. A waveguide illumination assembly as defined in claim 11 wherein the at least one arm is two arms, the light source centered above the license plate, the transport positioned vertically, each arm having an elbow and a horizontal portion, the elbow extending between the transport and the horizontal portion, the horizontal portion having the array of reflective elements and the termination end.

14. A waveguide illumination assembly as defined in claim 13 wherein the arm is conical having a diameter, the elbow forms a 90 degree turn having a radius, the radius measured to the centerline, the radius to diameter ratio being equal to or greater than 3:1.

15. A waveguide illumination assembly as defined in claim 14 wherein the transport is clear plastic, polycarbonate, or acrylic.

16. A waveguide illumination assembly as defined in claim 15 wherein the reflector shell is plated onto the transport.

17. A waveguide illumination assembly as defined in claim 1 wherein the array of reflective elements comprises a roughened portion of the outboard side of the arm.

18. A waveguide illumination assembly for illuminating a vehicle license plate comprising:

a light bulb and a reflector centered above the license plate, the bulb disposed between the reflector and the license plate;

a transport positioned outboard of the license plate perimeter, the transport having a light coupling end and a tail end; and at least one arm positioned outboard of the license plate perimeter, the at least one arm contiguous to the tail end of the transport, each arm having a termination end, an outboard side, and an inboard side, the outboard and inboard sides extending from the tail end of the transport to the termination end, the inboard side disposed substantially between the license plate and the arm, the outboard side and the termination end being roughened to internally reflect light within the arm and thereby refract light through the inboard side and onto the license plate.

19. A waveguide illumination assembly as defined in claim 18 wherein the outboard side becomes progressively rougher moving forward and away from the tail end of the transport and along the arm.

* * * * *

UNITED STATES PATENT AND TRADEMARK OFFICE
CERTIFICATE OF CORRECTION

PATENT NO.     : 6,471,379 B2
DATED          : October 29, 2002
INVENTOR(S)    : Lloyd Keith Bucher and George Robert Hulse It is certified that error appears in the above-identified patent and that said Letters Patent is hereby corrected as shown below:

<u>Column 3,</u>
Line 42, after "and a" insert therein -- common --.

Signed and Sealed this

First Day of July, 2003

JAMES E. ROGAN
*Director of the United States Patent and Trademark Office*